Sept. 7, 1965 G. E. MAIER 3,205,427
PHASE-CYCLE TRANSMUTOR
Filed March 12, 1962
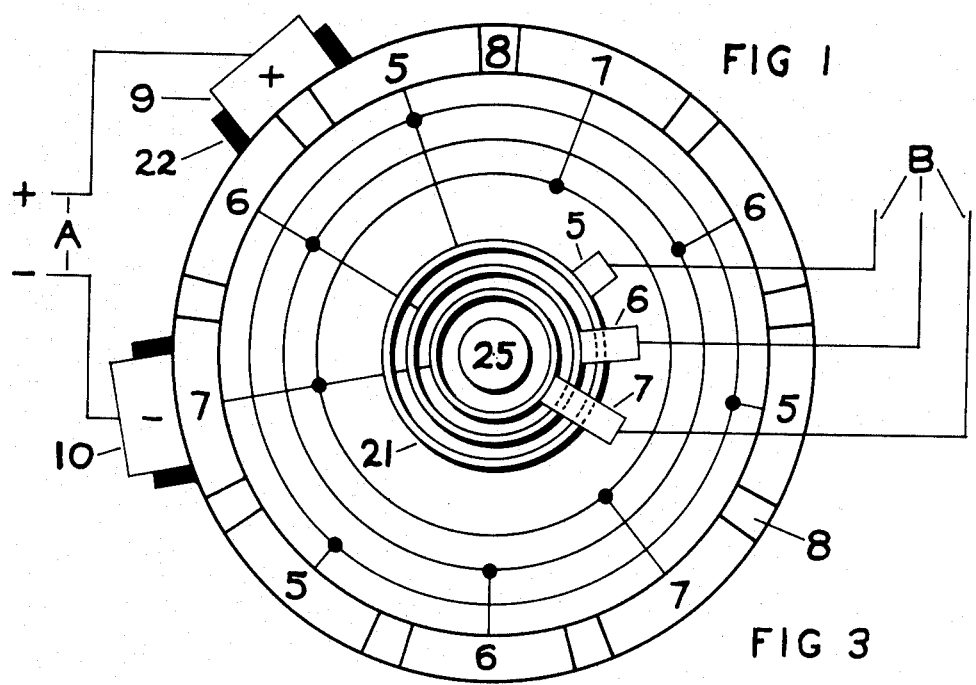
FIG 1
FIG 3
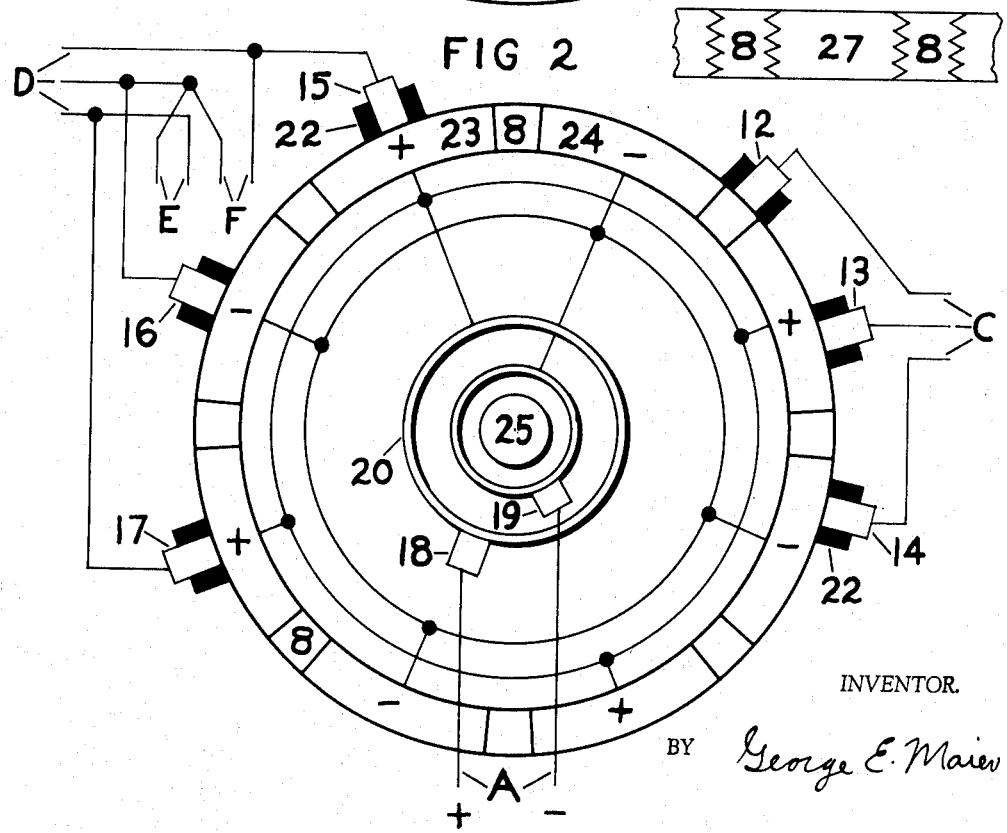
FIG 2
INVENTOR.
BY *George E. Maier*

United States Patent Office 3,205,427
Patented Sept. 7, 1965

3,205,427
PHASE-CYCLE TRANSMUTOR
George E. Maier, 1031 S. Ilena St., Oxnard, Calif.
Filed Mar. 12, 1962, Ser. No. 180,066
5 Claims. (Cl. 321—50)

This invention pertains to electrical transmuting equipment for rectifying direct current flow to reform directly into periodic pulsating circulations having desirable characteristics of alternating circuit operations.

The resultant purpose of the invention is to provide a comprehensive and compact mechanical device, which can be electrically operated in an efficacious manner suitable to furnish adapting alternating currents of any desirable phase and frequency within a great range of very low to high current cycles for dynamic distribution, whose primary operative power being derived from continuous current generation.

A constructive object of the apparatus is to provide an electro-current oscillator which will proficiently transmit forceful electrical currents that is well suited for actuating alternating current motors, especially induction type motors to operate under full torque with current safety at all motor speeds. This facility providing a most effective flexible current cycle control for driving electric motors under every operative condition, being well adapted for locomotive equipped with A.C. induction motors.

Another object is to construct a versatile cycle transmutor for transmitting several independent species of electrical current phases simultaneously from a single rotor operation.

The objects and features of advantage are set forth in the following description of the invention, which is illustrated in the drawing accompanying and forming part of the specification.

FIGURES 1 and 2 of drawing depicts diagrammatic views in elevation of a particular rotary segmental arrangement forming the constructive operating means of the transmutor.

FIGURE 3 conveys a distinguished rotating segment devised with a series of electrical serrated or saw-toothed edges, whereby causes the brushes bearing in contact therewith to sever the electrical circuits gradually in view of providing sparkless current breaking.

The embodiment shown in FIGURE 1, comprises a multiple segmented rotor facility of special construction, having combined three phase segments 5, 6 and 7 electrically arranged in groups of successive order relative to each other. Segments of same phase being electrically connected together in series.

These three phase groups of segments being connected electrically with three slip or collector rings 21, on which bears stationary brushes 5, 6 and 7 precisely associated with their respective phase segments 5, 6 and 7, and whereby the leads from the three slip ring brushes form the three phase distribution circuit B. 8 indicates spacing and insulation between the segments 5, 6, and 7. Stationary set positive brush 9 and negative brush 10 engaging the rotor segments being connected to direct current at A. 22 represents spark repelling insulation attached around and bearing on the segments together with the brushes to repel sparking when the brushes break contact with each segment. Segments 5, 6 and 7 to be mounted and rotated on a spider or disc insulated from the segments; the spider or disc together with the slip rings 21 being insulated from but attached separately to drive shaft 25.

FIGURE 2 is a versatile form of the transmutor possessing two qualified species of three phase circuits operated by drive shaft 25. One of the three phase species herewith delivering a formation of two phase current in conjunction with two single phase circuits. 23 indicating positive segments and 24 negative segments, each segment of same current sign electrically interconnected in series respectively to their kind around the transmutor's circumference. 8 indicating insulating separations between the segments 23 and 24. Collector rings 20 electrically connected respectively with their associate segments 23 and 24. Collector rings and segments being separately mounted on drive shaft 25. Positive brush 18 and negative brush 19 engaging collector rings 20 connect with direct current supply at A. 12, 13 and 14 phase brushes forming in combination the three phase circuit means to the exterior at C. Brushes 15, 16 and 17 represents another designed form of three phase circuit distributing at D. E and F devise two single phase circuits and together form the two phase circuit, derived from the three phase current of D. 22 refers to spark repelling insulation surrounding the brushes 12, 13, 14, 15, 16, and 17. Insulation 8 being wider than the brushes whereby they make complete break with the segments without short-circuiting when changing current direction.

FIGURE 3 is a fragmentary top view of the transmutor's segmental operating surface, showing the contact edges of the segments with serrated formation for assisting the engaging brushes to graduate their making and breaking of the current with the segments, whereby to effect suppression of sparking. 27 represents the rotating current serrated segments, which refers in relation to segments 5, 6, 7, 23, and 24 of FIGURES 1 and 2 respectively. Serrated segment 27 especially suitable to be used in association with brush insulation 22. 8 depicting insulation between the segments.

All brushes to be held in their respective places by fitting mechanism attached to the transmutor's framework.

In accordance with the invention's construction, arrangement of parts and mode of operation, means are provided for rectifying a direct or continuous current into forming an efficient discharging alternate current suitable to any cycle, which frequency may be changed at any time. The frequencies per second imparted depending on the rotational speed and number of segments contained in the revolving structure, which rotor movement would be controlled by variable speed motor joined with shaft 25. The segments may be rotated in either direction, in which case, motors connected thereto will change rotational direction as the directional motion of the segments are changed. The segments 23 and 24 are depicted to be sufficiently wide whereby they will engage two of the phase brushes together at one instance, and they may be of any number, length and width. Several series of brushes applied to the segments may be placed around the rotor to pick up large currents under low amperage per brush engagement.

Under operation of FIGURE 1, all segments are individual current sections of phases directly related in part to the whole of the three-phase circuit. Then it will be noted that as the segments rotate under the D.C. brushes 9 and 10 they continually make and break contact therewith, and in doing so change the current direction in the distribution leads to outlet B.

Segments 5 and 6 are shown in contact with positive brush 9, while segment 7 is in contact with negative brush 10. Considering clockwise rotation; as segment 5 moves out of circuit with brush 9, segments 6 and 7 will be in circuit contact with brushes 9 and 10 respectively. Then when associate segment 5 moves in contact with negative brush 10 current direction is changed in that phase, at which time segments 5 and 7 will engage brush 10, while segments 6 contacts brush 9. Therefore, as each moving segments makes and breaks circuit with brushes 9 and 10, two, or three, of the segments will be in contact with these brushes alternately, by which segmental movement the incoming D.C. current from main line A is caused to change polarity and direction of flow in each of the phases leading through associate slip rings 21 and their respective brushes 5, 6 and 7 and out to dispenser B. This procedure of current transformation forms a rotation magnetic field to the operation of alternating current motors, as well as, being adaptable to function through alternating current transformers.

FIGURE 2 describes a versatile polyphase transmutor construction, providing two separate three-phase current species operating on a single segmented rotor. Each species independently operating without reference to the other, since they function individually in delivering their own electrical current separately for distribution. Brushes 12, 13 and 14 combine in forming one of the distinct three-phase circuits. Phase brush 12 is shown out of circuit on insulation 8, while phase brush 13 engages positive segment 23, and phase brush 14 being in contact with negative segment 24.

As the segments are rotated they will alternately engage and break contact with the phase brushes 12, 13, and 14, which interrupts the direct current flow from line A causing it to change direction in each phase accordingly. Two, or three, of the phase brushes will successively be in contact with rotating segments; while the one phase brush on passing out of circuit by the insulation is in the process of changing current direction. Then during the current distribution process two of the phase together will engage one segment while the third brush engages a succeeding segment, and being that each of the phase brushes following in succession one at a time are continually changing positive and negative segment contact, a similarity sine pattern sequence is defined, whereby completion of the three phase alternating current frequency is maintained in the power distribution utility at C.

Phase brushes 15, 16 and 17 form another three-phase transmutor modified species. These three brushes being spaced equally relative to the occupancy of the individual positive and negative segments, for which the brushes will simultaneously make and break contact with the rotating segments together, thus causing the direct current from main circuit A through brushes 18 and 19 and collector rings 20 connecting the segments to successively change direction in the circuit, thereby forming the three-phase alternating current leading to distribution D.

In the lead wire from brush 15 to D, a branch line goes to F. In the lead from brush 16 a branch line Y is formed, one leg goes to E, and the other leg a second line to F. While the lead from brush 17 gives a second line to E. Then as segments rotate, alternating currents will be formed in E and F, which may be utilized in single phase, or two phase currents along with the three-phase distribution.

I claim:

1. An electrical transmutor for transforming direct current into three-phase alternating current readily providing operation at any frequency, a rotor comprising plurality of rotating current contact segments insulated separately affixed to a drive shaft, said segments arranged in groups of three imparting three circuits phases each, means for electrically connecting the segments of same phase together in series; three phase collector rings contacting three phase brushes, said collector rings separately affixed to said shaft, means for electrically connecting the phase groups of three segments of said collector rings respectively; a positive and a negative brush contacting said segments and connected with direct current, and in combination therewith said positive and said negative brush each in succession engage two segments together, then engage one segment sequentially effecting three-phase current distribution.

2. An electrical transmutor for changing direct current into two independent species of three phase alternating currents simultaneously, a rotor affixed to a drive shaft comprising individual positive and negative segments electrically connected into groups of two segments each, positive and negative collector rings electrically communicating with said segments respectively, said collector rings and segments separately attached to said drive shaft; direct current applied to stationary brushes of said collector rings; two independent stationary groups of three brushes each engaging the segments said segments independently spaced sufficiently with insulation whereby said brushes completely severs contact without short circuiting on changing from one segment to another; each group of said brushes dispensing two distinctly separate species of three-phase current under one rotary operation.

3. An electrical three-phase transmutor, comprising group of rotating positive and negative segments electrically connected to positive and negative direct current collector rings respectively; said segments of same current sign electrically connected together in series, said collector rings and segments separately applied to a drive shaft; group of three stationary brushes engaging the segments providing three phase current and said segments separated by wide insulation permitting said brushes to sever contact completely before engaging a succeeding segment; each brush under segment rotation changes current direction in succession one at a time, two of said brushes together repeatedly engaging each individual rotating segment, with a third brush contacting a succeeding segment; the combination hereto deriving distinct species of three-phase alternating circuit.

4. An electrical polyphase transmutor in combination, comprising group of rotating positive and negative segments individual segments of same current sign electrically interconnected together, two direct current collector rings electrically connected to said segments said collector rings and said segments mounted separately to a drive shaft; three stationary brushes contacting the segments providing three phase circuits, insulation placed between segments sufficiently spaced whereby said brushes completely sever contact without short-circuiting on changing from one segment to another; said three brushes successively contact two positive segments and one negative segment, then in turn contact two negative segments and one positive segment, and said segments together under rotation change current direction in said phase circuits simultaneously, effecting three phase characteristic alternating current.

5. Electrical rotating segments, said segments providing serrated current contact edges for graduating the current severance.

References Cited by the Examiner

UNITED STATES PATENTS

| | | | |
|---|---|---|---|
| 501,558 | 7/83 | Cabot | 321—50 |
| 1,119,397 | 12/14 | Bullock | 321—50 |
| 1,842,340 | 1/32 | Eaton | 321—50 |
| 2,389,391 | 11/45 | Slepian | 321—50 |
| 3,040,236 | 6/62 | Fields et al. | 321—50 |

FOREIGN PATENTS

| | | |
|---|---|---|
| 1,686 | 1/07 | Great Britain. |
| 169,694 | 12/22 | Great Britain. |
| 139,711 | 8/61 | Russia. |

LLOYD McCOLLUM, *Primary Examiner.*